(12) United States Patent
Ito

(10) Patent No.: US 7,920,784 B2
(45) Date of Patent: Apr. 5, 2011

(54) ELECTRONIC DEVICE, ELECTRONIC CAMERA, LIGHT SOURCE DEVICE, ILLUMINATION DEVICE, AND PROJECTOR DEVICE

(75) Inventor: Akinori Ito, Matsudo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/651,092

(22) Filed: Dec. 31, 2009

(65) Prior Publication Data

US 2010/0103304 A1    Apr. 29, 2010

Related U.S. Application Data

(60) Division of application No. 12/073,041, filed on Feb. 28, 2008, now Pat. No. 7,664,386, which is a continuation of application No. PCT/JP2007/069495, filed on Oct. 4, 2007.

(30) Foreign Application Priority Data

Oct. 4, 2006  (JP) ................................ 2006-273039
Apr. 2, 2007  (JP) ................................ 2007-096350

(51) Int. Cl.
    *G03B 15/03*    (2006.01)
(52) U.S. Cl. ........................................ 396/155; 396/429
(58) Field of Classification Search .................. 396/155, 396/429; 361/688, 704, 707, 709–712, 714–715
    See application file for complete search history.

(56) References Cited

U.S. PATENT DOCUMENTS

| 4,733,335 | A | 3/1988 | Serizawa et al. | |
| 7,164,077 | B2 * | 1/2007 | Venkatasubramanian | 136/203 |
| 7,625,091 | B2 * | 12/2009 | Fujinawa et al. | 353/52 |
| 2003/0210719 | A1 | 11/2003 | Yamamoto et al. | |
| 2005/0184386 | A1 | 8/2005 | Suzuki et al. | |
| 2006/0050515 | A1 | 3/2006 | Fujinawa et al. | |
| 2006/0076572 | A1 | 4/2006 | Huber et al. | |
| 2007/0053166 | A1 * | 3/2007 | Hwang et al. | 361/717 |

FOREIGN PATENT DOCUMENTS

| JP | 3-164415 | 7/1991 |
| JP | 11-17068 | 1/1999 |
| JP | 11-267099 | 10/1999 |
| JP | 2000-151164 | 5/2000 |
| JP | 2001-261851 | 9/2001 |
| JP | 2005-250392 | 9/2005 |
| JP | 2006-49878 | 2/2006 |

(Continued)

OTHER PUBLICATIONS

U.S. Appl. No. 12/073,041, filed Feb. 28, 2008, *Electronic Device, Electronic Camera, Light Source Device, Illumination Device, and Projector Device*, Nikon Corporation, Tokyo, Japan.

(Continued)

*Primary Examiner* — Bot L LeDynh

(57) ABSTRACT

An electronic device includes a heat generating member arranged in a body, and a heat transmission member of a shape of a three-dimensional body having at least a first surface that is joined to the heat generating member and a second surface that is joined to an inner surface of the body. The first surface of the heat transmission member has an area greater than or equal to an area of the heat transmission member joined to the heat generating member, and an entire area of the second surface is joined to the inner surface of the body.

15 Claims, 12 Drawing Sheets

FOREIGN PATENT DOCUMENTS

JP    2006-253197    9/2006

OTHER PUBLICATIONS

International Search Report, mailed Nov. 6, 2007 and issued in corresponding International Patent Application No. PCT/JP2007/069495.

USPTO Office Action mailed Dec. 5, 2008 in U.S. Appl. No. 12/073,041.
USPTO Office Action mailed Jun. 19, 2009 in U.S. Appl. No. 12/073,041.
USPTO Notice of Allowance mailed Sep. 28, 2009.
Communication issued by the European Patent Office on Nov. 11, 2010 in the related European patent application No. EP 07 82 9233.1.

* cited by examiner

HIGH HEAT CONDUCTIVITY DIRECTION

HIGH HEAT CONDUCTIVITY DIRECTION

HIGH HEAT CONDUCTIVITY DIRECTION

HIGH HEAT CONDUCTIVITY DIRECTION

ELECTRONIC DEVICE, ELECTRONIC CAMERA, LIGHT SOURCE DEVICE, ILLUMINATION DEVICE, AND PROJECTOR DEVICE

CROSS-REFERENCE TO RELATED APPLICATIONS

This application is a divisional of U.S. patent application Ser. No. 12/073,041, filed on Feb. 28, 2008 now U.S. Pat. No. 7,664,386, which is a continuation of International application no. PCT/JP2007/069495 filed Oct. 4, 2007, claiming foreign priority from Japanese patent application nos. 2006-273039 filed Oct. 4, 2006, and 2007-096350 filed Apr. 2, 2007. The contents of U.S. patent application Ser. No. 12/073,041, International application no. PCT/JP2007/069495, and Japanese patent application nos. 2006-273039 and 2007-096350 are herewith incorporated by reference.

BACKGROUND

1. Field

The present invention relates to an electronic device, an electronic camera, a light source device, an illumination device, and a projector device, that include a heat dissipation device for dissipating heat that is generated from a heat generating member.

2. Description of Related Art

In Japanese Laid-Open Patent Publication 2005-250392, there is disclosed an electronic device endowed with a projection function.

SUMMARY

With this type of electronic device, when the luminance of the projected light is high, the problem arises of heat emission by the light source unit.

An electronic device according to the present invention comprises a heat generating member arranged in a body; and a heat transmission member of a shape of as a three-dimensional body having at least a first surface that is joined to the heat generating member and a second surface that is joined to an inner surface of the body, and in this electronic device the first surface of the heat transmission member has an area greater than or equal to an area of the heat generating member, joined to the heat generating member, and an entire area of the second surface is joined to the inner surface of the body.

It is desirable that the shape of the heat transmission member of this electronic device is a hexahedron surrounded by approximately quadrilaterals. Furthermore, a length of a shorter side of the quadrilateral that forms the second surface is greater than or equal to ½ of a length of a longer side of the quadrilateral that forms the first surface.

It is desirable that in the electronic device described above, the second surface is provided with a screw hole, and the second surface and the inner surface of the body are fixed together by a screw through the screw hole.

It is desirable that the heat generating member of the electronic device described above, includes a substrate and a light emitting element implemented on the substrate. Furthermore, the heat transmission member may be made of aluminum. The body of this electronic device is made of metal. Furthermore, it is desirable that the electronic device further comprises a thermally conductive member provided between the first surface and the heat generating member, and between the second surface and the inner side of the body.

It is desirable that in the electronic device described above, the heat generating member includes a light source that irradiates illumination light towards a subject to be illuminated; the light source is provided within the body so that a rear surface of the light source is approximately orthogonal to the inner surface of the body; and the heat transmission member includes an anisotropically thermally conductive block that transmits heat emitted by the light source from the rear surface of the light source to the inner surface of the body.

An electronic camera according to the present invention comprises a heat transmission member described above. It is desirable that this electronic camera further comprises a photographic lens provided upon a front surface of the electronic camera; and a display monitor that displays a captured image provided upon a rear surface of the electronic camera, and the second surface of the heat transmission member is joined to the front surface of the electronic camera.

A light source device according to the present invention comprises a light source that irradiates illumination light towards a subject to be illuminated; a heat dissipation plate that has a heat dissipation surface approximately orthogonal to a rear surface of the light source, and that dissipates heat generated by the light source to an exterior; and an anisotropic thermally conductive block that transmits heat generated by the light source from the rear surface of the light source to the heat dissipation plate. The light source may be fixed to a body via the anisotropically thermally conductive block.

It is desirable that the anisotropically thermally conductive block is shaped as a solid body having at least a first surface that is joined to the rear surface of the light source and a second surface that is joined to the heat dissipation plate, the first surface having an area greater than or equal to an area of the anisotropically thermally conductive block joined to the rear surface of the light source and an entire area of the second surface being joined to the heat dissipation plate.

In the light source device described above, the anisotropic thermally conductive block can comprise a first anisotropically thermally conductive block whose thermal conductivity in a direction approximately orthogonal to the rear surface of the light source is higher than a thermal conductivity in a direction parallel to the rear surface, and a second anisotropically thermally conductive block whose thermal conductivity in a direction approximately orthogonal to a high heat conductivity direction of the first anisotropically thermally conductive block is higher than a thermal conductivity in a direction parallel to the high heat conductivity direction of the first anisotropically thermally conductive block. In this light source device, the heat generated by the light source can be transmitted to the heat dissipation plate via the first anisotropically thermally conductive block and the second anisotropically thermally conductive block.

It is desirable that the anisotropically thermally conductive block of this light source device has a curved thermal transmission path, and transmits the heat generated by the light source from the rear surface of the light source to the heat dissipation plate by the curved heat transmission path. Furthermore, the high heat conductivity direction of the anisotropically thermally conductive block may be a direction of the heat dissipation surface of the heat dissipation plate against the rear surface of the light source.

It is desirable that the anisotropically thermally conductive block of the light source device described above includes a composite material made of a matrix and a substance in columnar or fiber form whose thermal conductivity is higher than that of the matrix.

It is desirable that the matrix comprises metal, and the substance in columnar or fiber form comprises a carbon fiber whose thermal conductivity is higher than that of the metal.

It is also desirable that the matrix comprises a resin, and the substance in columnar or fiber form comprises a carbon fiber whose thermal conductivity is higher than that of the resin.

An electronic camera according to the present invention comprises a light source device described above. This electronic camera can further comprise a projector that projects a projected image with illumination light from the light source device that is described above.

An illumination device according to the present invention comprises a light source device described above.

A projector device according to the present invention comprises a light source device described above.

DESCRIPTION OF EMBODIMENTS

In the following, preferred embodiments for implementation of the present invention will be explained with reference to the drawings.

Embodiment One

Figure 1:
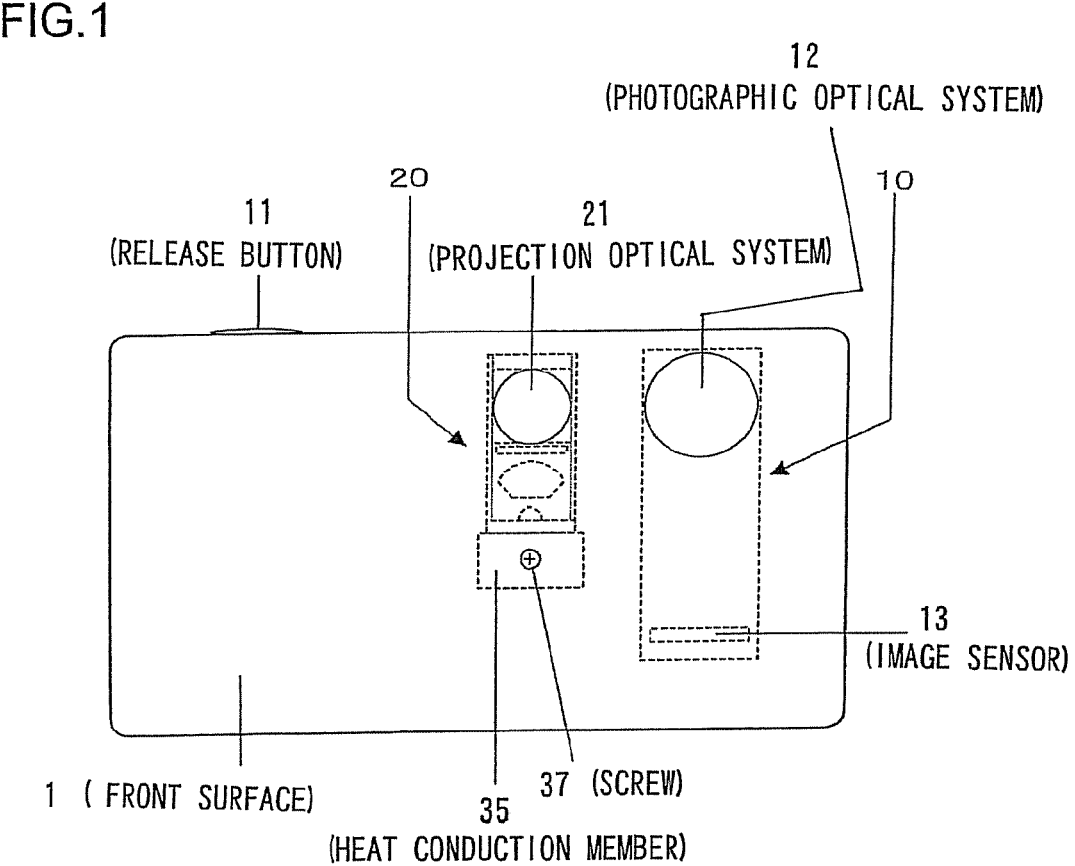
FIG. 1 is a figure showing an electronic camera with internal projector according to a first embodiment of the present invention, as seen from the front.

FIG. 1 is a figure showing an electronic camera with an incorporated projector according to the first embodiment of the present invention (hereinafter termed a "projector-equipped electronic camera" or sometimes simply "electronic camera" or "camera") as seen from the front. In FIG. 1, a photographic optical system 12 and a projection optical system 21 are provided on the side of a front surface 1 of this projector-equipped electronic camera. And a release button 11 is provided on the side of an upper surface of a body of this projector-equipped electronic camera. While this projector-equipped electronic camera is in a state of being mounted upon a desk or the like, or in a state of being mounted upon a cradle not shown in the figures, information to be projected, such as an image or the like, is projected from the projection optical unit 20 to a screen or the like that is disposed in front of this projector-equipped camera by an internally housed projection unit 20 (i.e. a projector). This projector includes a LED (Light Emitting Diode) light source, as will be described hereinafter. Since the amount of heat emitted by this LED light source is large, it is necessary to dissipate this heat efficiently to the exterior.

Figure 2:
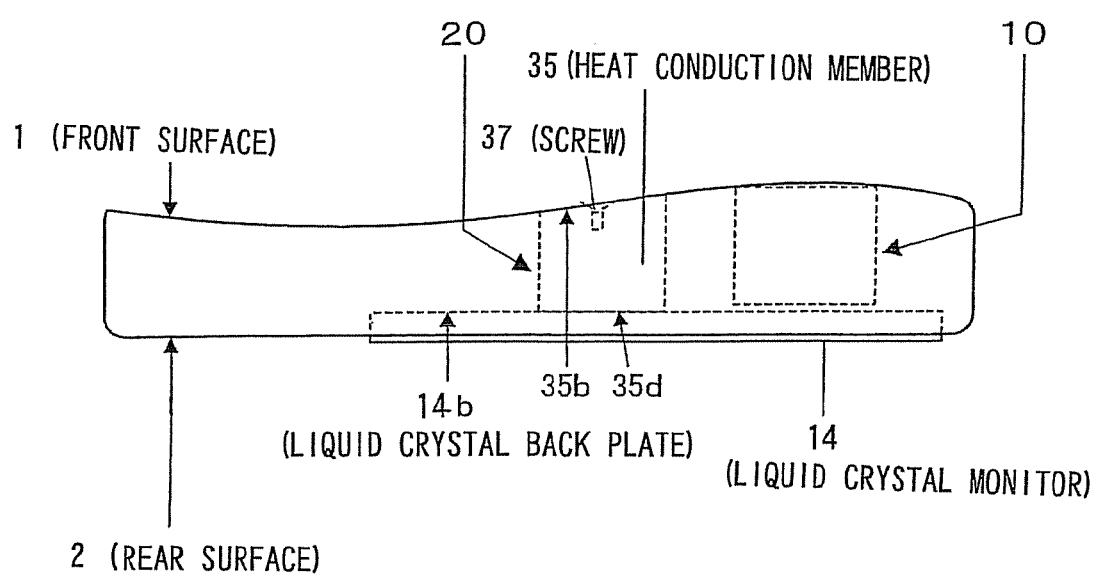
FIG. 2 is a figure showing the electronic camera with internal projector of FIG. 1, as seen from its bottom surface.

FIG. 2 is a figure showing the electronic camera of FIG. 1 as seen from its bottom surface. In FIG. 2, a liquid crystal monitor 14 is provided upon a rear surface 2 of the body of this projector-equipped electronic camera. The front surface 1 of the body of this projector-equipped electronic camera has a curved surface. Among the front surface 1 and the rear surface 2 of the body, at least the front surface 1 of the body is made of metal.

According to FIGS. 1 and 2, an image-capturing unit 10 (shown by broken lines) is disposed on the right side as one faces the camera. In concrete terms, the photographic optical system 12 is disposed at the upper right portion of the front surface 1 of the body, and an image sensor 13 is disposed in the vicinity of the right bottom surface. The projection unit 20 (shown by broken lines) is disposed at the upper end portion over the approximate center (the center in the left and right direction) of the body of this electronic camera, and arranged side by side with the image-capturing unit 10.

The photographic optical system 12 that is incorporated in the image-capturing unit 10 is a refracting optical system that conducts a photographic light flux incident from the front surface 1 of the body side to the image sensor 13 by bending it around within the camera body. By using this type of refracting optical system, the space between the front surface 1 and the rear surface 2 of the body of this projector-equipped electronic camera is made to be thin.

A heat conduction member 35 that is incorporated in the projection unit 20 is fixed to the inside of the front surface 1 of the body of this projector-equipped electronic camera by a screw 37. The surface 35$b$ of this heat conduction member 35 on the side of the front surface 1 of the body is processed into a curved surface so as to follow the interior surface of the front surface 1 of the body. Since this surface 35$b$ of the heat conduction member 35 is fixed by a screw to the front surface 1 of the body with a thermally conductive sealing member 36$b$ (see FIG. 3) being put between them, the heat conduction member 35 is fixed so that it is brought into a plane contact with the surface of the front surface 1 of the body. Moreover, the surface 35$d$ of the heat conduction member 35 on the side of the rear surface 2 of the body is processed into a planar surface, so as to follow the surface of the back plate 14$b$ of the liquid crystal monitor 14. This back plate 14$b$ is a panel member that is made of metal. The structure is such that, in the state in which the front surface 1 and the rear surface 2 of the body are joined together, the back plate 14$b$ and the heat conduction member 35 contact against one another with a thermally conductive sealing member, not shown in the figures, being put between them.

Figure 3:
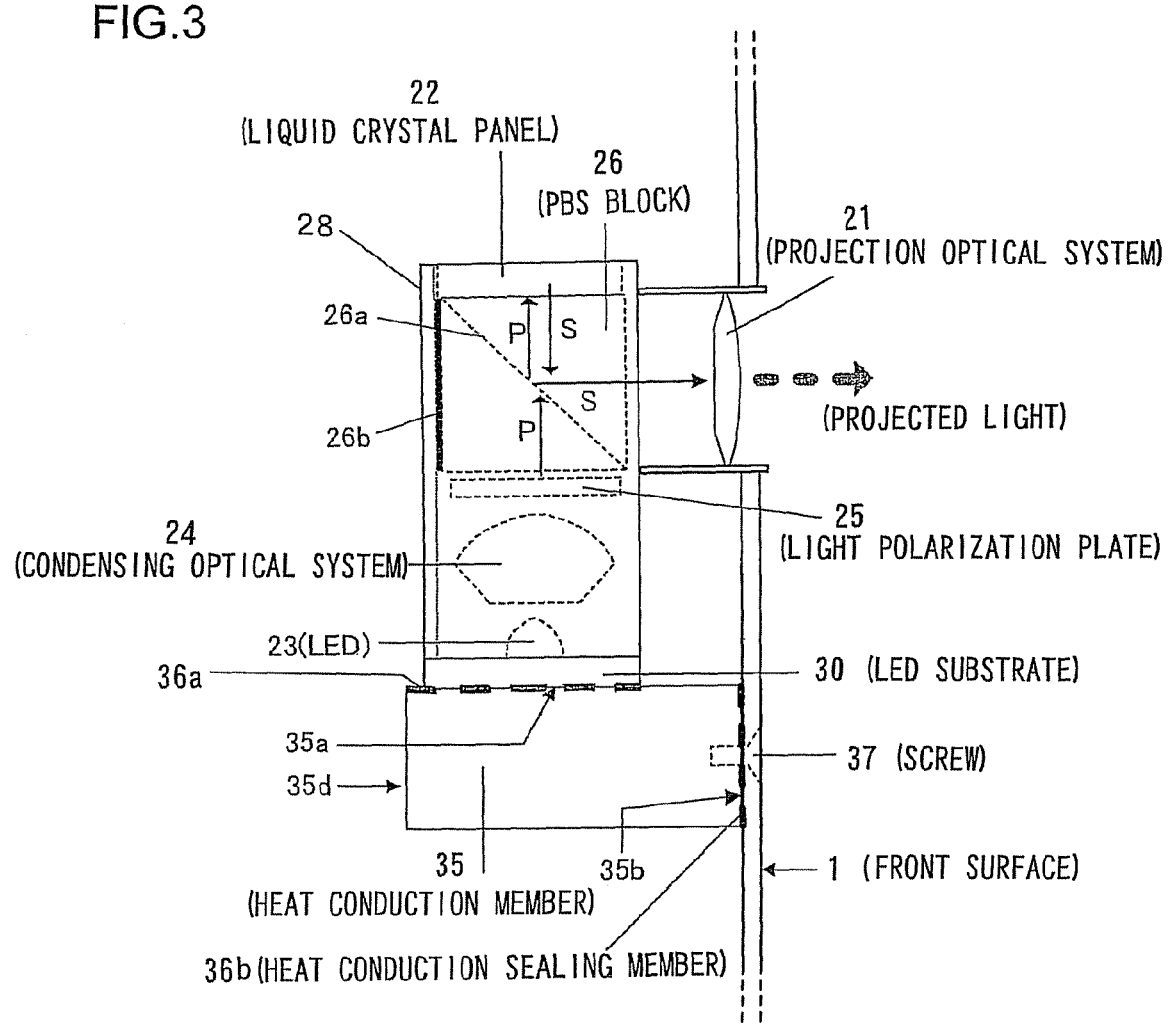
FIG. 3 is a figure showing an optical system of a projection unit, as seen from the left side in FIG. 1.
Figure 4:
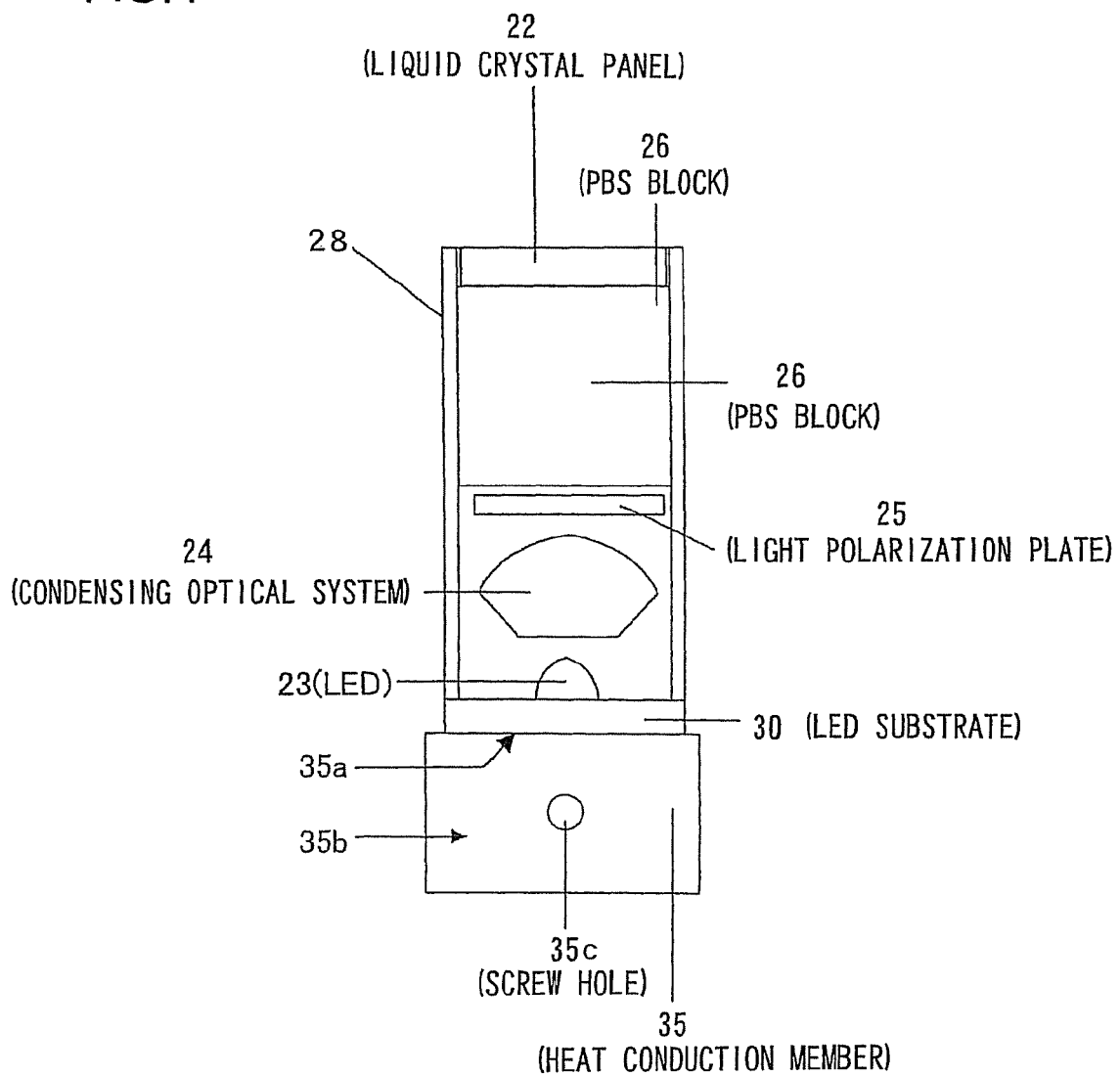
FIG. 4 is a figure showing the optical system of FIG. 3, as seen from the front.

The details of the projection unit 20 will now be explained with reference to FIGS. 3 and 4. FIG. 3 is a figure showing the optical system of the projection unit 20 as seen from the left side in FIG. 1. And FIG. 4 is a figure showing the optical system of FIG. 3 as seen from the front surface side, with the front surface 1 of the body and the projection optical system 21 being omitted.

The optical system of the projection unit 20 is made as a module (hereinafter termed the "projection module") of a four cornered column shape whose bottom surface is an approximately about 10 by 10 mm square. This projection module is disposed with its lengthwise direction vertical (top to bottom), and its bottom surface (i.e. its lower surface) is joined to the heat conduction member 35. It should be understood that, in FIGS. 3 and 4, the size of the four cornered column in the lengthwise direction is shown as longer than it actually is, in order to make the internal structure easier to see.

In the projection module, there are included a LED 23 (a LED substrate 30), a condensing optical system 24, a light polarization plate 25, a PBS (polarized beam splitter) block 26, a liquid crystal panel 22, and a projection optical system 21. The structure is such that all of the members described above, except for the projection optical system 21, are integrated within a shell member 28. In concrete terms, the LED substrate 30 is disposed upon the lower open surface of a member 28, which is processed by bending a thin plate member made from aluminum into an angular letter C shape. The LED substrate 30 is made from an aluminum plate, and the LED 23, that is a light emitting element, is mounted upon a wiring pattern that is formed upon an insulating layer upon the substrate.

Further, a condensing optical system 24 and a PBS block 26 are adhered to the shell member 28. The PBS block 26 is a polarized beam splitter in which a polarized light separation portion 26a that subtends an angle of 45° with respect to the optical axis of the incident light is put between two triangular prisms. Non-reflection treatment, for example blackening treatment or the like, is performed upon a surface 26b of this PBS block 26.

A light polarization plate 25 is disposed upon the lower surface of the PBS block 26 (i.e. upon its surface towards the condensing optical system 24). And a liquid crystal panel 22 that is constituted by a reflective type liquid crystal element (LCOS) is disposed upon the upper surface of the PBS block 26.

The heat conduction member 35 consists of, for example, an aluminum block in the shape of a three-dimensional body that is surrounded by a quadrilateral. The material from which this heat conduction member 35 is made need not be aluminum; it would be acceptable for it to be any material whose thermal conductivity is high, such as copper or graphite or the like. Since this heat conduction member 35 is a member that constitutes a heat conduction path, it is desirable to make its thermal resistance low. Accordingly, processing that reduces the cross section of the heat conduction path (for example, grinding down the surface of the heat conduction member 35 to form fins) is avoided. Moreover, along with ensuring that the thickness of this heat conduction member 35 (its size along the vertical direction in FIG. 3, i.e. the short side of the quadrilateral defined by its surface 35b) is greater than or equal to a predetermined value (for example 5 mm), also the length of the heat conduction member 35 (its size along the horizontal direction in FIG. 3, i.e. the long side of the quadrilateral defined by its surface 35a) is kept down to less than or equal to twice its thickness.

In order to provide good heat conductivity from the heat generating member (in this embodiment, the LED substrate 30), this heat conduction member 35 is joined to the LED substrate 30 at their surfaces. In concrete terms, a filler material whose thermal conductivity is high is loaded between the surface 35a of the heat conduction member 35 and the LED substrate 30, or a thermally conductive sealing member 36a is put between them, so that they are joined together. In order to enhance the performance for conducting heat from the LED substrate 30, the surface 35a of the heat conduction member 35 has an area greater than or equal to the joining surface of the LED substrate 30. A screw hole 35c is provided upon the surface 35b of the heat conduction member 35. As described above, the surface 35b of the heat conduction member 35 and the front surface 1 of the body are held together with a screw 37, so that their surfaces are contacted together with a thermally conductive sealing member 36b being put between them. By doing this, the heat conduction member 35 is also endowed with a function of holding the projection unit 20.

With the projection module of the structure described above, a drive current is supplied to the LED 23 upon the LED substrate 30 via a harness and a wiring pattern not shown in the figures. The electrical power that is consumed by the LED substrate 30 is about 2 W. The LED 23 emits light of brightness corresponding to the drive electrical current towards the condensing optical system 24. The condensing optical system 24 causes the light from the LED to be incident upon the light polarization plate 25 as approximately parallel light. This light polarizing plate 25 converts this incident light into linearly polarized light or extracts linearly polarized light from this incident light, and emits the polarized light after conversion (or extraction) towards the PBS block 26.

The polarized light flux (for example, P polarized light) that is incident upon the PBS block 26 passes through the PBS block 26 and illuminates the liquid crystal panel 22. The liquid crystal panel 22 consists of a plurality of picture elements upon which red, green, and blue filters are formed, and is driven so as to generate a color image. When the light that is to pass through the liquid crystal layer of the liquid crystal panel 22 is incident upon the liquid crystal panel 22, it progresses through the liquid crystal layer in the upwards direction in FIG. 3, and, after having been reflected off the reflective surface of the liquid crystal panel 22, then progresses in the downwards direction in FIG. 3 through the liquid crystal layer 22 and is emitted from the liquid crystal panel 22, to be incident upon the PBS block 26 for a second time. Since the liquid crystal layer functions as a phase plate when voltage is applied thereto, this light that is incident upon the PBS block 26 for a second time is a mixture of modulated light, that is S polarized light, and non-modulated light, that is P polarized light. In the PBS block 26 only the modulated light, that is the S polarized light component in this light flux that is incident for a second time, is reflected (folded around) by the polarized light separation portion 26a, and is emitted as projection light towards the optical system 21 on the right side of the drawing. The projection optical system 21 and a lens barrel are provided at the front surface 1 of the body.

On the front surface 1 of the body described above, it is desirable to apply a seal that is constituted by a heat insulating member over a predetermined region that includes the screw 37 (at least as broad as the area that contacts the heat conduction member 35). It is thereby possible to make hide the screw 37 from view by covering the screw 37 with this adhered seal, is possible to prevent the screw 37 coming loose, and is possible to ensure that the user cannot directly touch the portion on the front surface 1 of the body whose temperature can easily become elevated.

According to the first embodiment as explained above, the following beneficial operational effects are obtained.

(1) The LED substrate 30, that emits heat when the LED 23 is illuminated, is joined at its surface to the one surface 35a of the heat conduction member 35 that is shaped as a hexahedron block, and the other surface 35b of this heat conduction member 35 is joined to the inner surface of the body of this projector-equipped electronic camera, that is made from metal (i.e. is joined to the front surface 1 of the body). Since no heat spreader is included in the heat conduction path, the thermal resistance from the LED substrate 30 via the heat conduction member 35 to the front surface 1 of the body becomes small, and it is possible to dissipate the heat that is generated by the LED 23 into the space exterior to the body with good efficiency. Moreover, since no heat spreader is included, this contributes to making the camera more compact, and is particularly effective for an electronic camera of an ultra thin body that has a refracting type photographic optical system.

(2) The area of the front surface 1 of the body is broader than that of the rear surface 2 of the body, upon which the liquid crystal monitor 14 is disposed. Thus, by joining the heat conduction member 35 to the surface on the side of the photographic subject that is the surface whose body area is the broader (in other words, to the front surface 1 of the body), it is possible to dissipate the heat with good efficiency to the space exterior to the body, as compared to the case in which the heat conduction member 35 is joined to the rear surface 2 of the body.

(3) It is arranged to make the heat conduction member 35 as a block of aluminum whose thermal conductivity is high and to join between the LED substrate 30 and the heat conduction member 35, and between the heat conduction member 35 and the surface of the body that is made of metal with sealing member of high heat conductivity put therebetween with this construction. Due to this, it is possible further to reduce the thermal resistance of the heat conduction path, and it is possible further to enhance the heat dissipation efficiency.

(4) The area of the surface 35a of the heat conduction member 35 is wider than the area of the LED substrate 30 to which it is joined, and all of the surface 35b of the heat conduction member 35 is joined to the front surface 1 of the body. At this time, since it is ensured that the thickness of the heat conduction member 35 (i.e. its size in the vertical direction in FIG. 3) is greater than or equal to 5 mm, and the length of the heat conduction member 35 (i.e. its size in the horizontal direction in FIG. 3) is kept down to less than or equal to twice its thickness, it is possible to reduce the thermal resistance of the heat conduction path.

(5) Since the heat conduction member 35 and the body that is made of metal are fixed together by a screw, it is impossible for any gap to open up between the heat conduction member 35 and the metallic body, even if the surface of the metallic body becomes bent, so that it is possible to maintain the thermal resistance of the heat conduction path in a low state.

(6) The structure is such that the other surface 35d of the heat conduction member 35 that is joined neither to the LED substrate 30 nor to the metallic body is contacted against the surface of the back plate 14b of the liquid crystal monitor 14, with a thermally conductive sealing member put between them. As a result, the heat that is generated by the LED 23 can also be dissipated from the liquid crystal monitor 14 as well, and accordingly this heat can be dissipated into the space exterior to the body with good efficiency.

Variant Embodiment One

The shape of the heat conduction member 35 does not have to be a six sided shape. For example, by cutting off a portion of an aluminum sphere along a plane and by further cutting the incomplete sphere along a plane that intersects the previous plane of cutting, an incomplete spherical shape that has two surfaces may be obtained. By joining one of the cutting surfaces of this two-sided incomplete sphere is joined to the LED substrate 30, and by joining the other cutting surface thereof to the front surface 1 of the body, it is possible to obtain a similar beneficial operational effect to that described in (1) through (6) above.

Variant Embodiment Two

Figure 5:
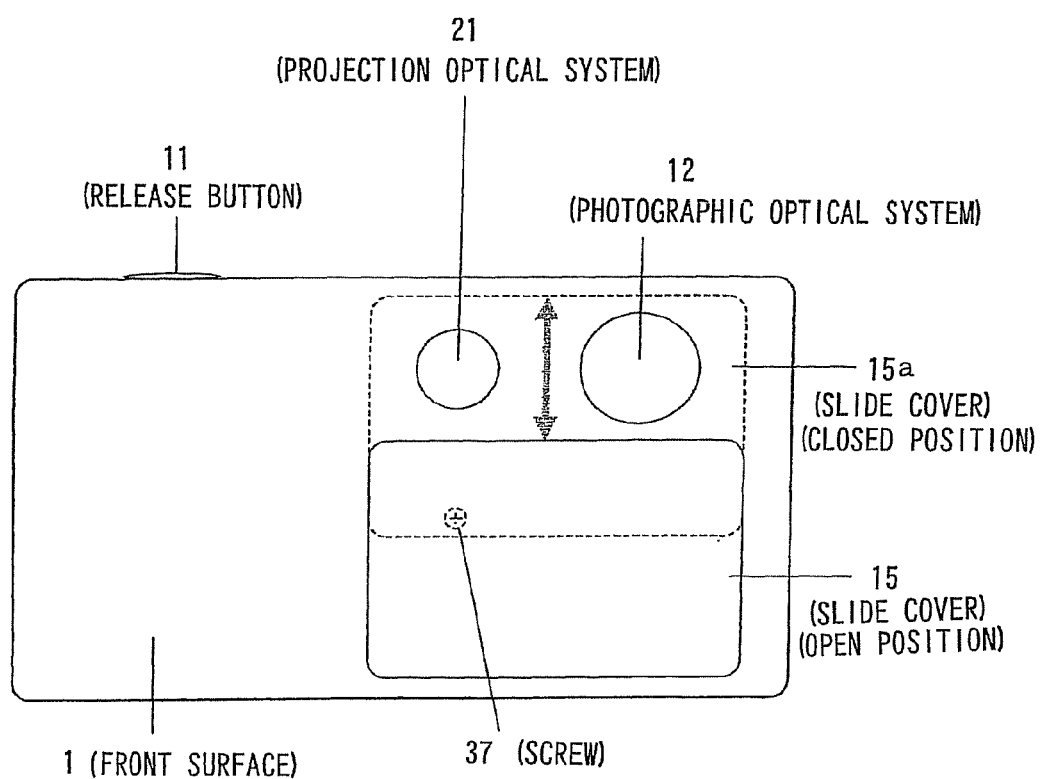
FIG. 5 is a figure showing an electronic camera with internal projector according to a second variant embodiment, as seen from the front.

It would also be acceptable to provide a sliding cover upon the front surface 1 of the body of this projector-equipped electronic camera, in order to protect the optical system 12 and the projection optical system 21. FIG. 5 is a figure showing a projector-equipped electronic camera in this case, as seen from the front. The solid lines show the slide cover 15 in the opened state (its position during use of the camera), and the broken lines show the slide cover 15a in its closed state (its storage position).

According to FIG. 5, a predetermined range that includes the screw 37 (and that is broader than the contact area against the heat conduction member 35) is always covered by the slide cover 15 (15a), irrespective of the position of the slide cover 15 (15a). Due to this, it is possible to ensure that the screw 37 is not visible, to ensure that the user does not directly touch that portion of the front surface 1 of the body whose temperature can easily become elevated, and to protect the photographic optical system 12 and the projection optical system 21 in the storage position.

Variant Embodiment Three

Figure 6:
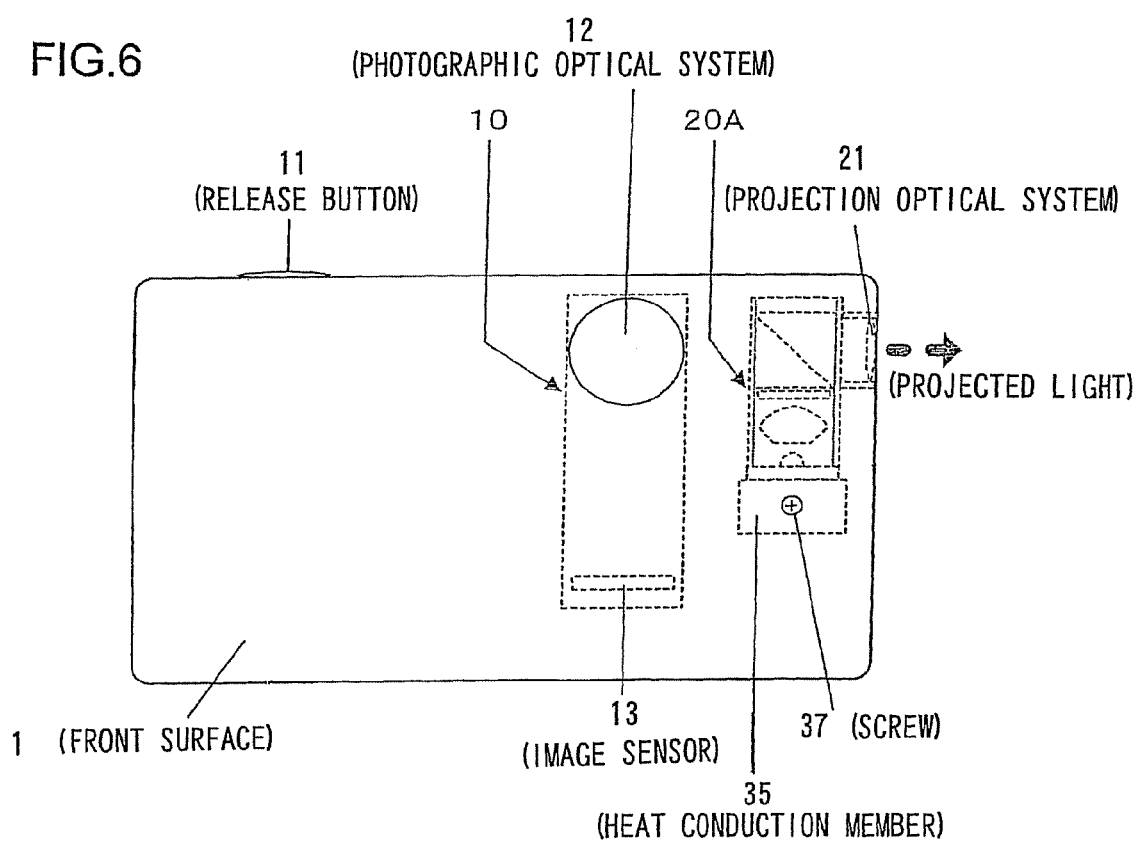
FIG. 6 is a figure showing an electronic camera with internal projector according to a third variant embodiment, as seen from the front.

FIG. 6 is a figure showing another example of a projector-equipped electronic camera that incorporates a projection unit 20A and an image capturing unit 10. In FIG. 6, the projection unit 20A (shown by the broken lines) is arranged at the right side when facing the body of this projector-equipped electronic camera with its lengthwise direction oriented vertically. And the image-capturing unit 10 (shown by broken lines) is arranged side by side with the projection unit 20A, with its lengthwise direction oriented vertically.

The direction in which the projection unit 20A in the projection module and the heat conduction member 35 are joined together is rotated through 90° around the optical axis of light emission from the LED 30, as compared to the case of the projection unit 20. Due to this, in the state in which the heat conduction member 35 is fixed by a screw to the front surface 1 of the body, the projection light by the projection unit 20A is emitted in the rightwards direction in FIG. 6.

Variant Embodiment Four

Figure 7:
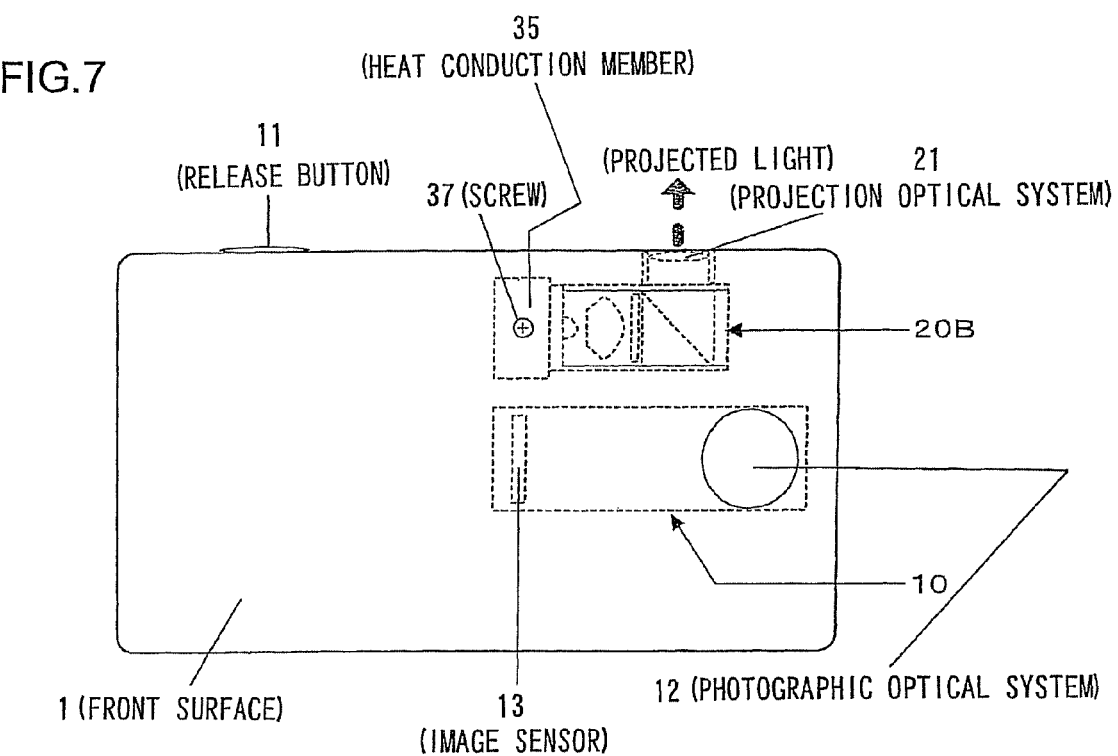
FIG. 7 is a figure showing an electronic camera with internal projector according to a fourth variant embodiment, as seen from the front.

FIG. 7 is a figure showing another example of a projector-equipped electronic camera that incorporates a projection unit 20B and an image capturing unit 10. In FIG. 7, the projection unit 20B (shown by the broken lines) is disposed approximately at the upper central edge portion of the body of this projector-equipped electronic camera, with its lengthwise direction oriented horizontally. And the image-capturing unit 10 (shown by broken lines) is arranged side by side with the projection unit 20B, with its lengthwise direction oriented horizontally.

The direction in which the projection unit 20B in the projection module and the heat conduction member 35 are joined together is rotated through 180° around the optical axis of light emission from the LED 30, as compared to the case of the projection unit 20A. Due to this, in the state in which the heat conduction member 35 is fixed by a screw to the front surface 1 of the body, the projection light by the projection unit 20B is emitted in the upwards direction in FIG. 7.

With Variant Embodiment #3 and Variant Embodiment #4 described above as well, each of the beneficial operational effects (1) through (6) of the first embodiment described above may be obtained.

It should be understood that, with Variant Embodiment #3 and Variant Embodiment #4, it is desirable to adhere a seal that consists of a heat insulating member to a predetermined region of the front surface 1 of the body that includes the screw 37 (at least as broad as the area to which the heat conduction member 35 is contacted). Or, it is desirable to provide a sliding cover upon the front surface 1 of the body that protects the photographic optical system 12, and to arrange for a predetermined region that includes the screw 37 (whose area is at least as broad as the area to which the heat conduction member 35 is contacted) to be always covered with this slide cover, irrespective of whether the slide cover is in its opened state or in its closed state.

Variant Embodiment Five

Although examples have been explained in which the front surface 1 of the body is shaped as a curved surface, it would also be possible to apply the present invention to a case in which it is shaped as a planar surface.

Moreover, although the example of a projector-equipped electronic camera has been explained with regard to the first embodiment, the present invention may also be applied to an electronic device such as a projection device, a portable telephone device with incorporated projector, a PDA (personal digital assistant) with incorporated projector, a sound recording and replaying device with incorporated projector, or the like, provided that it is equipped with a projection unit 20 (20A or 20B).

Embodiment Two

A second embodiment of the present invention will now be explained with reference to FIGS. 8 through 10B. In the following explanation, the same reference symbols will be appended to structural elements that are the same as in the first embodiment, and the explanation concentrates principally upon the points of difference from that of the first embodiment. Aspects that are not explained in particular are the same as in the first embodiment. An aspect of this embodiment that is different from the case with the first embodiment is that a composite material is used as the heat conduction member. In this second embodiment, when a heat conduction member of a conventional electronic device is provided of a ribbon shape that thermally connects together an internally housed heat emitting member and a heat dissipation member that dissipates heat generated by this heat emitting member, the problem of which the amount of heat that is conducted within the heat conduction member being small, so that it is not possible to dissipate the heat generated by the internally housed heat emitting member in an efficient manner is solved.

Figure 8:
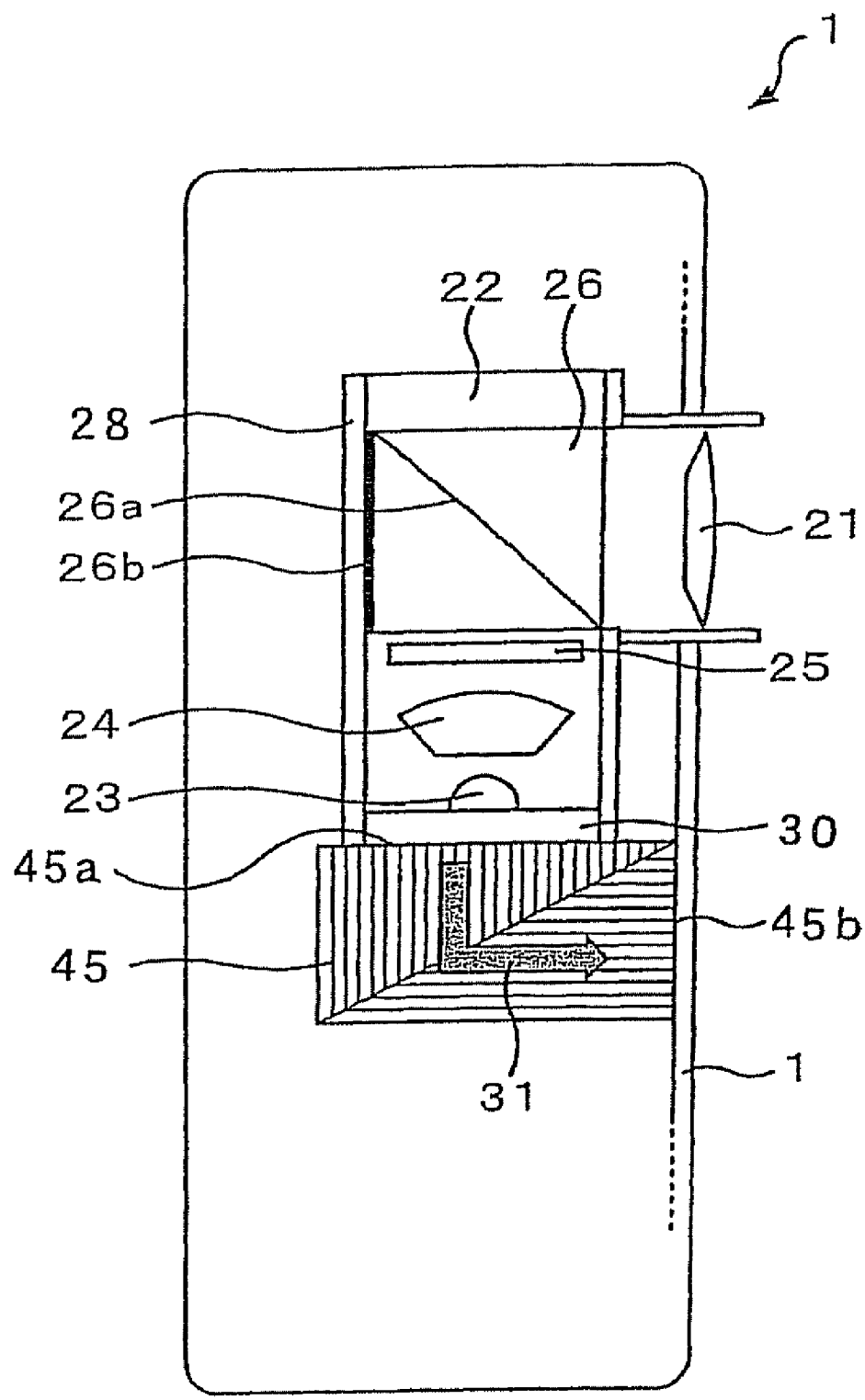
FIG. 8 is a figure for explanation of the heat conduction path of a heat conduction member in a second embodiment of the present invention.

With this projector-equipped electronic camera of the second embodiment, the heat that is generated from the LED 23 is conducted into the heat conduction member 45 from the surface 45a thereof, and is then conducted from the surface 45b of the heat conduction member 45 to the front surface 1 of the body of this projector-equipped electronic camera. And the heat that is generated from the LED 23 is then dissipated from the front surface 1 of the body of this projector-equipped electronic camera. In other words, as shown in FIG. 8, this camera has a heat dissipation surface that is approximately orthogonal to the rear surface of the LED 23, so that the heat that is generated from the LED 23 is conducted to the front surface 1 of the body of the projector-equipped electronic camera, that dissipates this heat to the exterior.

Figure 9:
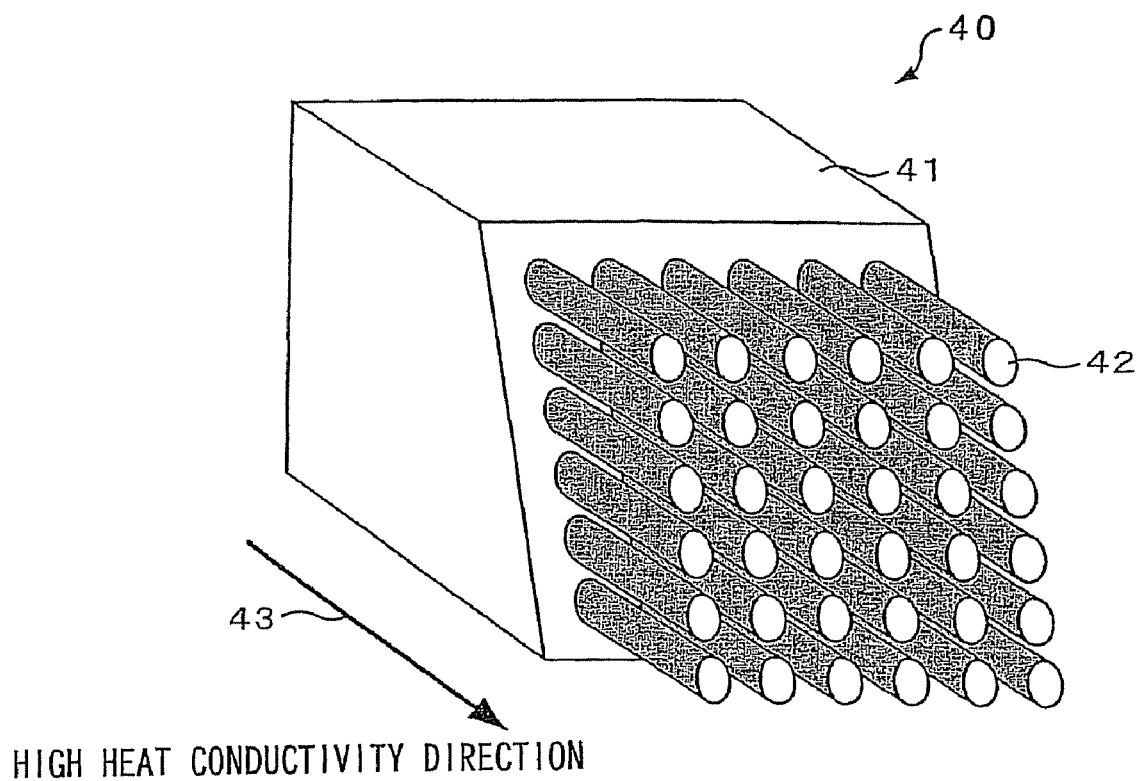
FIG. 9 is a figure for explanation of a material for this heat conduction member of the second embodiment.

As shown in FIG. 9, the material for this heat conduction member 45 is a carbon fiber composite material 40 in which oriented carbon fibers 42 are dispersed in an aluminum matrix 41. This carbon fiber composite material 40 has thermal conductivity anisotropy, and the thermal conductivity in the direction in which the carbon fibers 42 are oriented is high as compared to the other directions. In the following, this direction in which the thermal conductivity is high will be termed the high heat conductivity direction. The thermal conductivity of this carbon fiber composite material 40 in the high heat conductivity direction (shown by the arrow sign 43) is 700 W/m.k, and this is higher than the thermal conductivity of aluminum (238 W/m.k) or the thermal conductivity of copper (398 W/m.k).

Figure 10A:
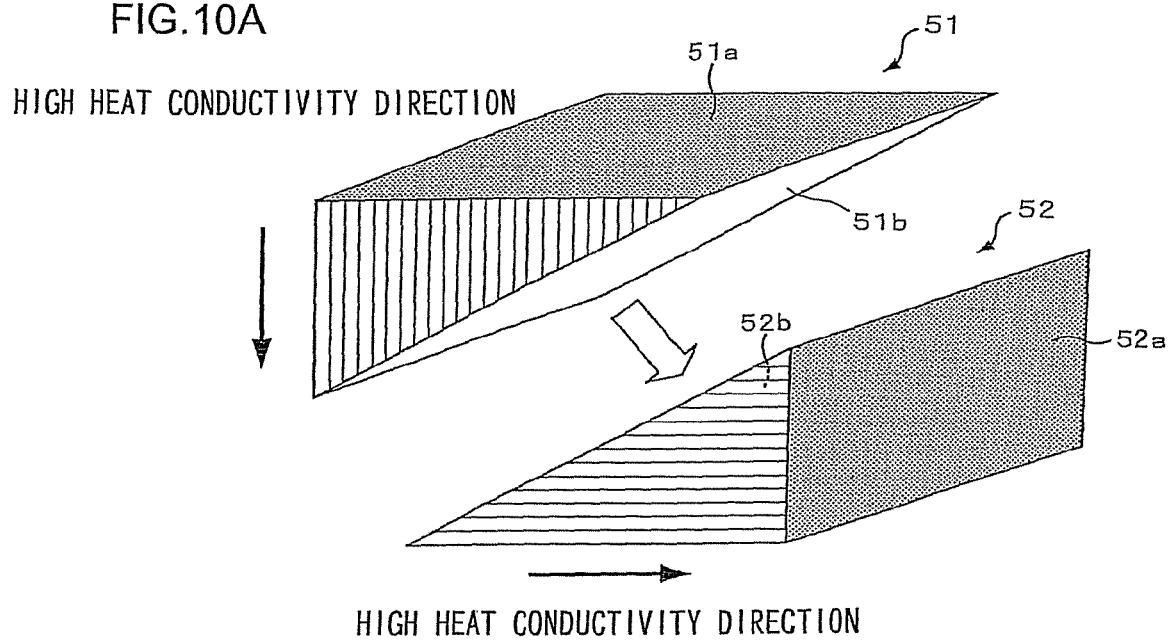
FIGS. 10A and 10B are figures for explanation of the construction of this heat conduction member of the second embodiment.

The heat conduction member 45 is manufactured by combining two blocks made from the above described carbon fiber composite material 40. As shown in FIG. 10A, the sizes and the shapes of the two blocks 51 and 52 that make up the heat conduction member 45 are the same, and they are both shaped as is triangular prisms having the cross sectional shape of a right angled triangle. The high heat conductivity direction of one of the blocks 51 is the perpendicular direction with respect to the surface 51a that constitutes the other of the sides that subtends the right angle of the above described right angled triangular shape. And the high heat conductivity direction of the other of the blocks 52 is the perpendicular direction with respect to the surface 52a that constitutes one of the sides that subtends the right angle of the above described right angled triangular shape. And the sloping surfaces 51b, 52b of the two blocks 51 and 52 are joined together with adhesive or solder or the like, so that the high heat conductivity directions of the two blocks 51 and 52 subtend approximately a right angle.

Figure 10B:
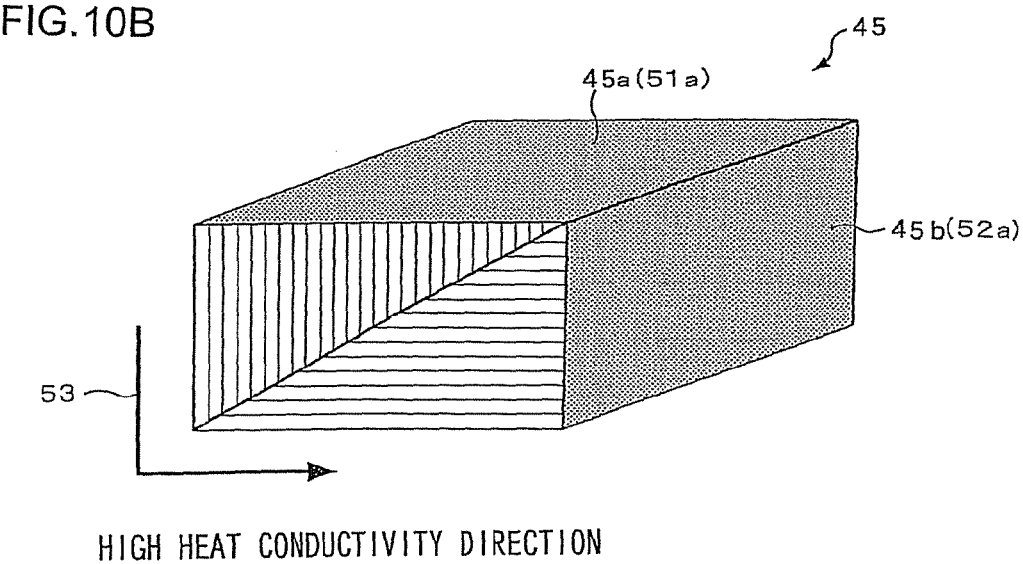

As shown in FIG. 10B, the assembly of the two blocks 51 and 52 that are thus joined together into a single block constitutes the heat conduction member 45. Here, the surface 51a of the block 51 becomes the surface 45a that is the junction surface with the LED substrate 30, while the surface 52a of the block 52 becomes the surface 45b that is the adhesion surface against the front surface 1 of the body of this projector-equipped electronic camera. In other words, in the block 51, its thermal conductivity in the direction that is approximately orthogonal to the rear surface of the LED substrate 30 becomes greater than its thermal conductivity in the direction that is parallel to the rear surface of the LED substrate 30, and, in the block 52, its thermal conductivity in the direction that is approximately orthogonal to the high heat conductivity direction of the block 51 also becomes greater than its thermal conductivity in the direction that is approximately parallel to the high heat conductivity direction of the block 51. As a result, as shown in FIG. 10B, the high heat conductivity direction of the heat conduction member 45 bends around a right angle from the direction of the surface 45a to the direction of the surface 45b (as shown by the arrow sign 53). By using this type of heat conduction member 45, it becomes easy to conduct heat (refer to the arrow sign 31 in FIG. 8) to the front surface 1 of the body of this projector-equipped electronic camera, that is approximately orthogonal to the rear surface of the LED substrate 27.

According to the second embodiment as explained above, the following beneficial operational effects are obtained.

(1) By using the heat conduction member 45, that is an anisotropically thermally conductive block, the heat that is generated from the LED 23 can be efficiently conducted to the front surface 1 of the body of this projector-equipped electronic camera, upon which the heat dissipation surface that is approximately orthogonal to the rear surface of the LED 23 is provided. Furthermore, it is possible to dissipate the heat generated from the LED 23 in an efficient manner, even though the space within the projector-equipped electronic camera is small.

(2) Since the heat conduction member 45 is a member that is fixed to the projection unit 20, it has a large cross sectional area so as to obtain sufficient strength for fixing the projection unit 20. Due to this, it is possible to make the heat conduction member 45 have a large amount of heat flow, and it is possible to conduct the heat generated by the LED 23 to the front surface 1 of the body of this projector-equipped electronic camera in an efficient manner.

(3) The heat conduction member 45 is of a three-dimensional body shape having at least the surface 45a that joins to the rear surface of the LED 23 and the surface 45b that joins to the front surface 1 of the body of this projector-equipped electronic camera, and the surface 45a has an area that is greater than or equal to the area that joins to the rear surface of the LED 23, and moreover it is arranged to join the entire area of the surface 45b to the front surface 1 of the body of this projector-equipped electronic camera. Due to this, it is possible to make the heat conduction member 45 have a large amount of heat flow, and it is possible to conduct the heat generated by the LED 23 to the front surface 1 of the body of this projector-equipped electronic camera in an efficient manner.

(4) The heat conduction member 45 includes the anisotropically thermally conductive block 51 that takes the high heat conductivity direction approximately orthogonal to the rear surface of the LED 23, and the anisotropically thermally conductive block 52 that takes the high heat conductivity direction approximately orthogonal to the high heat conductivity direction of the anisotropically thermally conductive block 51; and it is arranged for the heat conduction member 45 to transmit the heat generated by the LED 23 to the front surface 1 of the body of this projector-equipped electronic camera via the anisotropically thermally conductive block 51 and the anisotropically thermally conductive block 52. Due to this, the heat flow becomes easy in the right angled direction (the direction shown in FIG. 8 by the arrow sign 31), and accordingly it is possible to conduct the heat generated by the LED 23 in an efficient manner to the front surface 1 of the body of this projector-equipped electronic camera provided with a heat dissipation surface that is approximately orthogonal to the rear surface of the LED 23.

(5) A carbon fiber composite material 40 in which oriented carbon fibers 42 are dispersed within an aluminum matrix 41 is used as the heat conduction member 45. Since the thermal conductivity of the carbon fibers 42 is extremely high, it is possible to conduct the heat that is generated from the LED 23 with good efficiency in the high heat conductivity direction.

(6) Since the heat of the LED 23 is dissipated by the body of this projector-equipped electronic camera, it is possible to dissipate this heat with good efficiency due to the cooling operation of the external air.

Variant Embodiment Six

Figure 11:
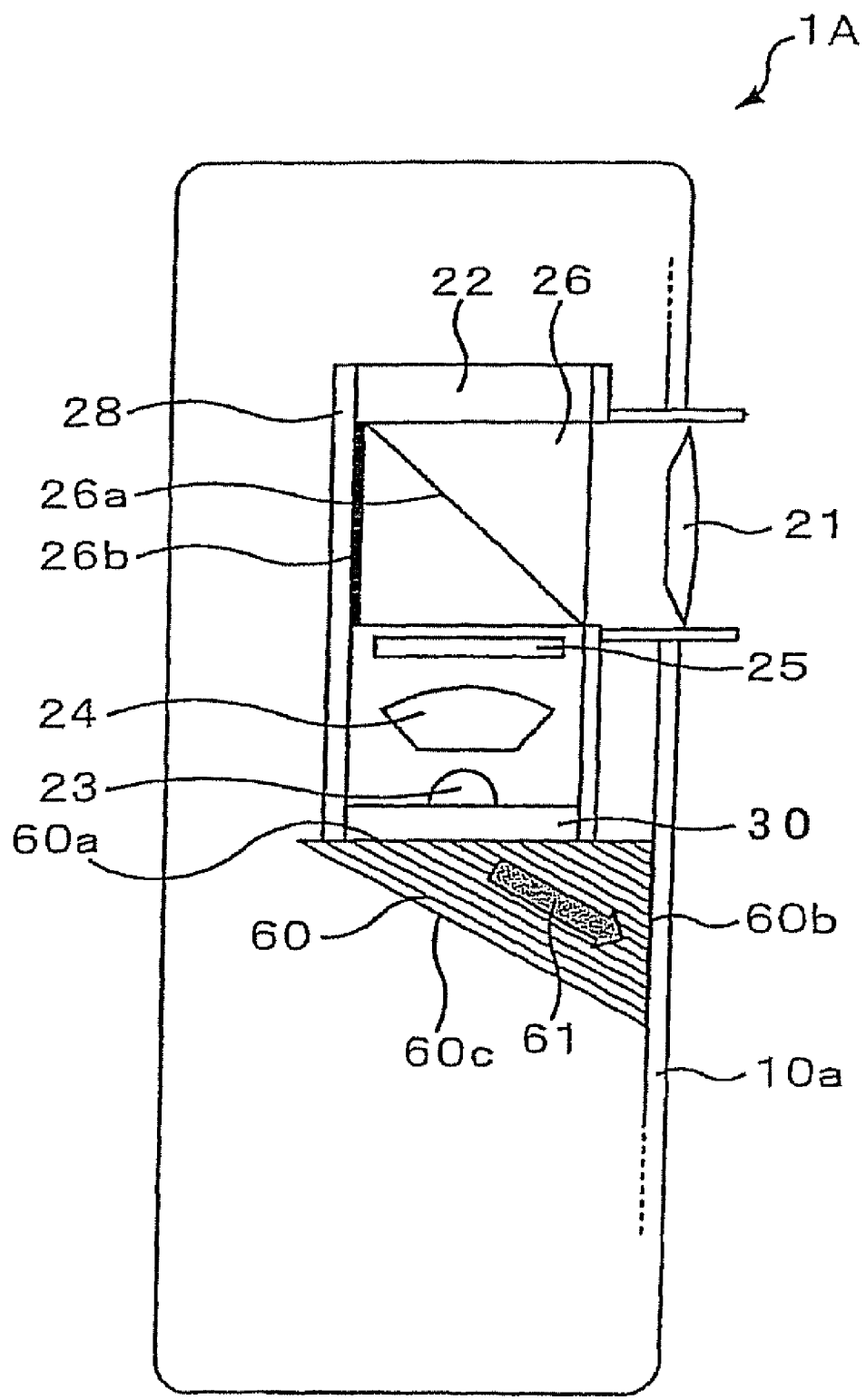
FIG. 11 is a figure for explanation of a sixth variant embodiment (a first variant embodiment of the heat conduction member)

The high heat conductivity direction of the heat conduction member 45 was a direction such as to bend through a right angle towards the direction of the rear surface of the LED 23, as shown by the arrow sign 31 in FIG. 3. However, as shown by the arrow sign 61 in FIG. 11, it would also be acceptable to arrange for the high heat conductivity direction of a heat conduction member 60 to lie in the direction of the heat dissipation surface of the front surface 1 of the body of a projector-equipped electronic camera 1A against the rear surface of the LED 23 (this is the first variant embodiment of the heat conduction member). With the first variant embodiment of this heat conduction member, the heat conduction member 60 is made as a triangular prism, having the cross sectional shape of a right angled triangle. The LED substrate 30 is joined to a surface 60a that contains one of the two edges that subtend the right angle of this right angle triangle cross section, and the front surface 1 of the body of this projector-equipped electronic camera is joined to the surface 60b that contains the other such edge. In this case, the orientation direction of the carbon fibers 42 is a direction that is approximately parallel to the surface 60c that contains the sloping edge of this right angle triangle cross section.

Due to this, it is possible to conduct the heat emitted from the LED 23 in an efficient manner to the front surface 1 of the body of this projector-equipped electronic camera that has a heat dissipation surface that is approximately orthogonal to the rear surface of the LED 23 and dissipates the heat emitted by the LED 23 to the exterior.

Moreover, it is possible to build this heat conduction member 60 is from a single block, as contrasted with the heat conduction member 45 that is made from the two blocks 51 and 52. Accordingly, it is possible to reduce the cost of materials and that of the assembly and so on. Furthermore since this heat conduction member 60 whose length of the heat conduction path is shorter as compared with that of the heat conduction member 45, accordingly it is possible to conduct the heat emitted from the LED 23 in an efficient manner to the front surface 1 of the body of this projector-equipped electronic camera.

Variant Embodiment Seven

Figure 12:
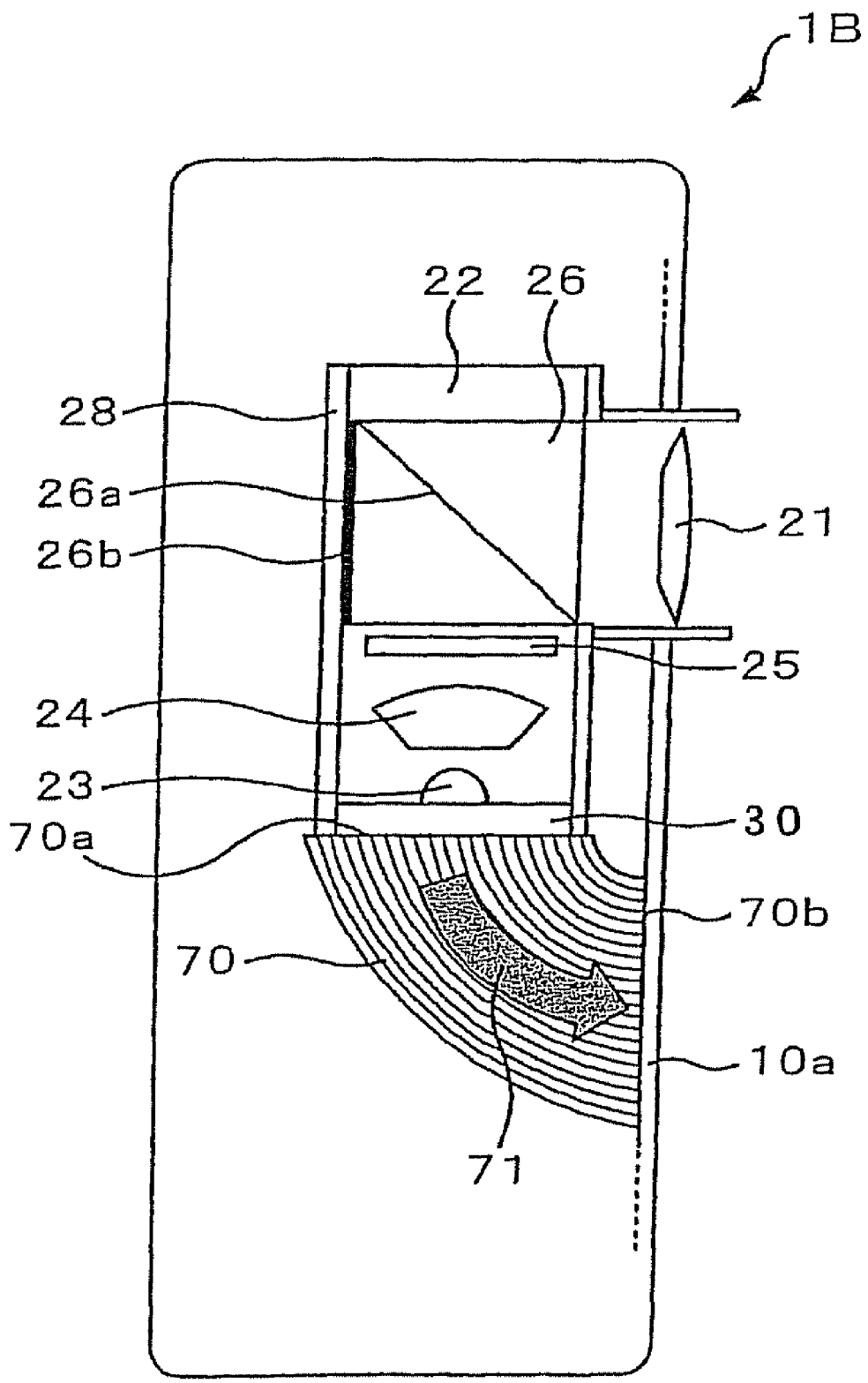
FIG. 12 is a figure for explanation of a seventh variant embodiment (a second variant embodiment of the heat conduction member).

As shown by the arrow sign 71 in FIG. 12, it would also be acceptable to arrange for the high heat conductivity direction of the heat conduction member 70 to change gradually in the direction from the rear surface of the LED 23 towards the direction of the heat dissipation surface of the front surface 1 of the body of the projector-equipped electronic camera, so as to have a curved heat transmission path in the heat conduction member 70 (this is the second variant embodiment of the heat conduction member). Due to this, it is possible to conduct the heat emitted from the LED 23 in an efficient manner to the front surface 1 of the body of this projector-equipped electronic camera that is provided with a heat dissipation surface that is approximately orthogonal to the rear surface of the LED 23. With this second variant embodiment of the heat conduction member, this heat conduction member 70 is manufactured by dispersing the carbon fibers 42 within aluminum 41, following a direction along which the fibers are formed in a curved shape.

Variant Embodiment Eight

The material for the heat conduction member 45 was supposed to be carbon fiber composite material 40 made by dispersing oriented carbon fibers 42 in a matrix of aluminum 41. However, a material that has anisotropic thermal conductivity is not limited to being such a carbon fiber composite material 40. For example, a composite material would also be acceptable that was made from some predetermined matrix, and a substance shaped as long columns or in fiber form that has a higher thermal conductivity than that of the matrix.

Since heat flows preferentially along the long column shaped or fiber form substance that has higher thermal conductivity than the matrix, accordingly this composite material has anisotropic thermal conductivity.

Variant Embodiment Nine

The material for the heat conduction member 45 was taken as being the carbon fiber composite material made from the carbon fibers 42 and the aluminum matrix 41. However, in the case of a carbon fiber composite material 40, the material of the matrix is not limited to being the one of the shown embodiments. For example, it would also be acceptable to use a different metal for the matrix, such as copper or the like. Moreover, it would also be acceptable to use some substance other than a metal for the matrix, such as, for example, epoxy resin or the like. By using this type of substance for the matrix, it is possible to protect the carbon fibers 42 that can easily suffer brittle fracture.

Even if a substance whose thermal conductivity is low such as resin is used as the matrix, it is still possible to make the thermal conductivity of the carbon fiber composite material high, since the thermal conductivity of the carbon fibers 52 is very much higher than that of the resin. Moreover, by using an insulating material such as resin, it is possible to ensure that the carbon fiber composite material is an insulator, which is sometimes convenient. By using resin, it is also possible to anticipate that the heat conduction member will be lighter.

Variant Embodiment Ten

Even with a light source other than the LED 23, it is possible to conduct the heat generated from the light source to the heat dissipation surface in an efficient manner with the heat conduction member 45. Accordingly, the light source that may be used with the heat conduction member 45 is not limited to the LED 23.

Variant Embodiment Eleven

The present invention is not limited to an electronic device with internal projector, provided that it is an electronic device that includes a light source device including: a light source; a heat dissipation plate that is provided with a heat dissipation surface approximately orthogonal to the rear surface of the light source; and an anisotropically thermally conductive block that transmits heat emitted by the light source from the rear surface of the light source to the heat dissipation plate. With an electronic device other than a projector-equipped electronic camera as well, it is possible for the light source device to dissipate the heat generated from the light source in an efficient manner in a small space. For example, it would also be acceptable to provide the light source device described above to a projector device. Furthermore, sometimes a LED may be used as a light source of illumination light for illuminating a photographic subject during nighttime photography or the like. In this case as well, heat dissipation of the heat generated from the LED to the exterior must be performed in an efficient manner. Accordingly, it would also be acceptable to provide a light source device according to an embodiment of the present invention to a camera equipped with an LED, or to an electronic flash device or the like.

Although various embodiments and variant embodiments have been explained in the above description, the present invention is not to be considered as being limited by the details thereof. Other modes that may be considered to fall within the range of the technical concept of the present invention are also included within the scope of the present invention.

What is claimed is:

1. An electronic camera, comprising:
 a body having a plurality of surfaces including at least a front surface and a rear surface with a thin space being disposed between the front surface and the rear surface;
 a photographic lens configured as part of a refracting optical system and provided upon the front surface;
 a display monitor provided upon the rear surface and configured to display a captured image; and
 a projector provided in the body and configured to project a projection light from the front surface, the projector including:
 a light source that irradiates the projection light and generates heat,
 a substrate on which the light source is mounted, and
 a heat transmission member having a three-dimensional shape with at least a first surface that is joined to the substrate and a second surface that is joined to an inner surface of the front surface of the body and that transmits the heat from the first surface to the second surface, wherein the first surface has an area greater than or equal to an area of the substrate, and an entire area of the second surface is joined to the inner surface of the front surface of the body.

2. A light source device, comprising:
 a light source that irradiates illumination light towards a subject to be illuminated and generates heat;
 a heat dissipation plate that has a heat dissipation surface approximately orthogonal to a rear surface of the light source and that dissipates the heat to an exterior; and
 an anisotropic thermally conductive block that includes at least a first surface and a second surface and transmits the heat along a thermal conductive direction from the first surface to the second surface, the first surface being joined to the light source and the second surface being joined to the heat dissipation plate, wherein
 a thermal conductivity in the thermal conductive direction is higher than a thermal conductivity in any other direction, and
 the anisotropic thermally conductive block has a curved heat transmission path along the thermal conductive direction, and transmits the heat from the rear surface to the heat dissipation plate along the curved heat transmission path.

3. A light source device according to claim 2, wherein:
 the light source is fixed to a body via the anisotropic thermally conductive block.

4. A light source device according to claim 2, wherein:
 the anisotropic thermally conductive block is shaped as a three-dimensional body, the first surface having an area greater than or equal to an area of the anisotropic thermally conductive block joined to the rear surface of the light source, and an entire area of the second surface being joined to the heat dissipation plate.

5. A light source device according to claim 2, wherein:
 the thermal conductive direction of the anisotropic thermally conductive block is a direction of the heat dissipation surface of the heat dissipation plate against the rear surface of the light source.

6. A light source device according to claim 2, wherein:
 the anisotropic thermally conductive block includes a composite material containing a matrix and a substance in columnar or fiber form whose thermal conductivity is higher than that of the matrix.

7. A light source device according to claim 6, wherein:
the matrix comprises metal, and the substance in columnar or fiber form comprises a carbon fiber whose thermal conductivity is higher than that of the metal.

8. A light source device according to claim 6, wherein:
the matrix comprises resin, and the substance in columnar or fiber form comprises a carbon fiber whose thermal conductivity is higher than that of the resin.

9. An electronic camera, comprising a light source device according to claim 2.

10. An electronic camera according to claim 9, further comprising:
a projector that projects a projected image with illumination light from the light source device.

11. An illumination device, comprising a light source device according to claim 2.

12. A projector device, comprising a light source device according to claim 2.

13. An electronic camera according to claim 1, wherein an area of the front surface is greater than an area of the rear surface other than the display monitor.

14. An electronic camera according to claim 1, wherein the refracting optical system is disposed at approximately a center of the front surface.

15. An electronic camera according to claim 1, wherein the heat transmission member has a shape of a hexahedron surrounded by approximately quadrilaterals, and a length of a shorter side of the quadrilateral that forms the second surface is greater than or equal to one-half of a length of a longer side of the quadrilateral that forms the first surface.

* * * * *